Dec. 29, 1936. E. S. CLARK 2,066,250
VALVE
Filed Feb. 4, 1932
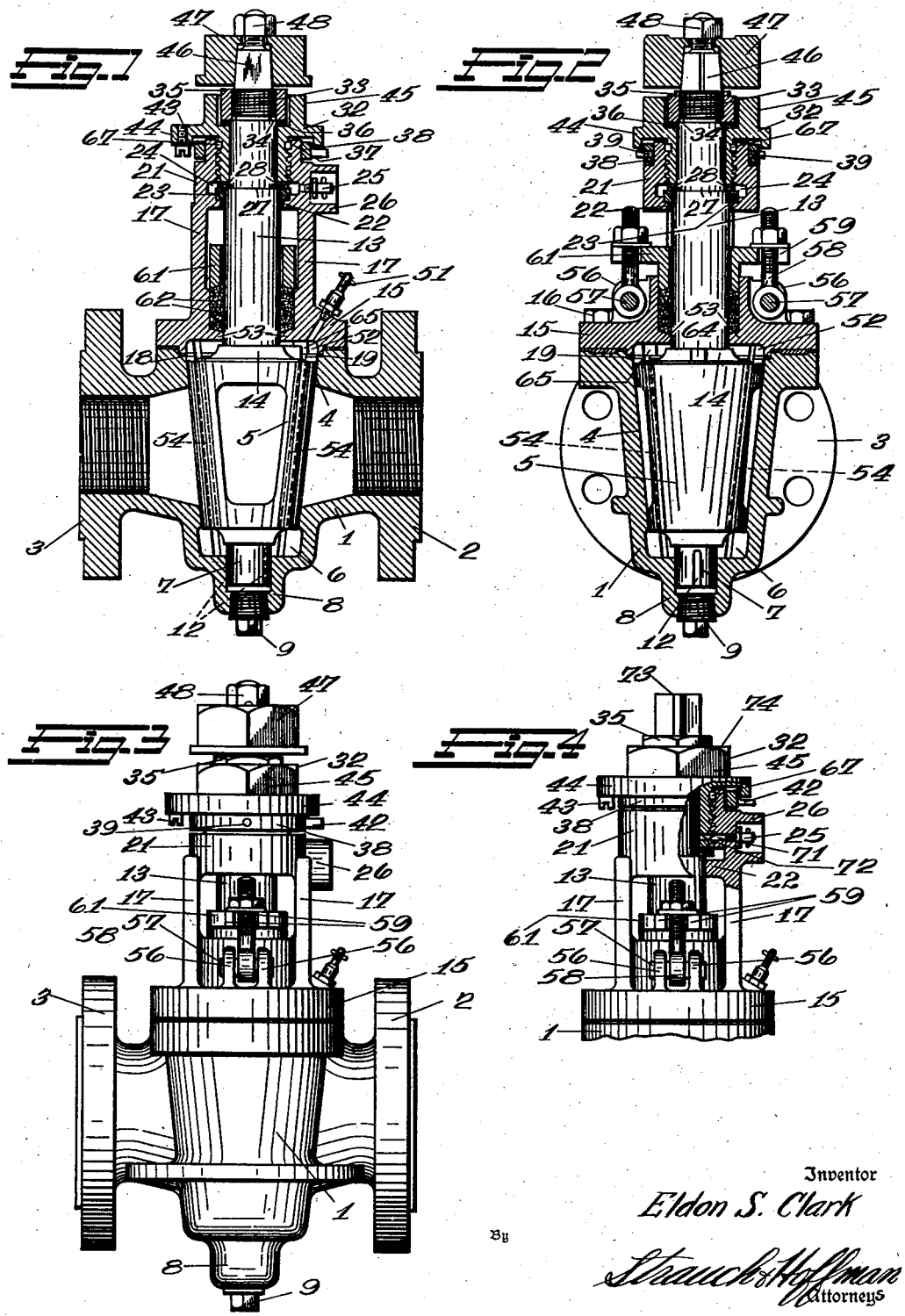
Inventor
Eldon S. Clark Patented Dec. 29, 1936

2,066,250

UNITED STATES PATENT OFFICE 2,066,250

VALVE

Eldon S. Clark, Detroit, Mich., assignor to Timken-Michigan Company, Detroit, Mich., a corporation of Michigan Application February 4, 1932, Serial No. 590,936

14 Claims. (Cl. 251—97)

This invention relates to a valve, and more particularly to a plug valve adapted for continuous and efficient operation under severe conditions of usage such as high temperatures and high pressures Plug valves or stop cocks have been used for many years on flow lines wherein relatively low pressures and low temperatures are maintained. However, the use of this type of valve on lines wherein high pressures and temperatures are attained has been limited, since the high pressures have generally caused sticking of the tapered valve plugs and the high temperatures caused a deterioration of the parts, and furthermore caused an unequal expansion and binding of the parts so that the valves could not be readily opened and closed. Furthermore in many installations foreign matter such as sand, grit, rust or the like, gets between the ordinary plug valve and its seat, and this foreign matter causes serious cutting of the valve plug and seat so that accurate and tight closing thereof soon becomes impossible.

The use of plug valves under severe operating conditions such as for gas, oil, or steam lines wherein high temperatures and pressures are attained has been limited, due to the lack of a practical and adequate means of lubricating the valve operating mechanism and the valve proper. The result has been that after relatively short periods of use, the plug valves became frozen in their seats and the valves either had to be broken completely or were so seriously damaged in loosening that they were practically inoperative.

One object of this invention therefore is to provide a valve of the plug type which may be used over long periods of time under severe operating conditions such as high pressures and temperatures.

Another object of this invention is to provide a plug valve of the lift type which embodies novel means to positively raise the plug from its seat, prior to the turning of the valve.

Another object of this invention is to provide a plug type valve having a readily accessible means to positively raise and lower the valve from and to its seat, with visible means serving as a stop to limit the raising and lowering of the valve. By the use of this limiting device, the valve may only be lifted a predetermined distance from its seat, this distance being sufficient to free the valve for ready rotation, but being insufficient to allow the entrance of dirt or grit between the plug valve and its seat.

Another object of this invention is to provide a plug valve of the lift type embodying a packing gland which is readily accessible for adjustment in all conditions, and which may be adjusted whether the valve is open or closed, and furthermore may be repacked without jeopardizing the safety of the operator while the line is under full pressure with the valve either open or closed.

Another object of the invention is to provide a means for adjusting the packing gland by separate gland bolts which are atmospherically cooled at all times and which are readily accessible without disassembling any parts.

Another object of this invention is to provide a plug valve of the lift type embodying a lubricant reservoir above the packing gland whereby the valve stem may be adequately lubricated to prevent binding thereof, and wherein an effective and simple seal is provided for the lubricant chamber to prevent the entrance of grit or gases to the lubricant chamber.

A further object of the invention is to provide a valve of the above described type wherein the lifting of the valve is readily and simply accomplished by rotation of a lift nut acting between two abutments on the valve stem, with means to lubricate the threads of the lift nut and the bearings for the valve stem, and means to prevent the entrance of foreign matter into the screw adjustment for the lift nut.

Another object of this invention is to provide a plug valve of the screw lift type in which rotation of the plug valve is prevented until the plug is raised out of contact with its seat. Thus there can be no wear or scoring effected in the close metal to metal contact between plug and seat.

Another object of the invention is to provide a plug valve of the screw lift type embodying a false nut for rotating the valve from open to closed position and vice versa, and a lift nut for raising and lowering the valve from its seat, the false nut and the lift nut having the same configuration whereby a single operating handle or wrench may be used on both nuts.

A further object of the present invention is to provide a plug valve of the screw-lift type easily assembled and disassembled for inspection and repairs and which is rugged in use under the most severe operating conditions.

These and futher objects of the present invention will be apparent from the following description and appended claims when taken in conjunction with the accompanying drawing wherein:

Figure 1 is a vertical section taken through one preferred embodiment thereof.

Figure 2 is a section taken at right angles to Figure 1.

Figure 3 is an elevation of the valve of Figures 1 and 2.

Figure 4 is a broken section of a modified form.

Referring to the drawing wherein like reference characters designate like parts, the novel valve mechanism includes a valve casing 1, having an open top and having the flanged ends 2 and 3 adapted for the reception of similar flanges on the interconnected pipes. It will be understood that screw-threaded connections at the two ends may be substituted for the flanges 2 and 3. The passages leading into the body 1 of the valve communicate with a frustro-conical seat 4 adapted for the reception of a rotary plug valve 5.

The lower end of the valve seat 4 is positioned just above a chamber 6, and the valve 5 has an integrally formed depending pilot or guide 7 which extends through chamber 6 into a bearing cap 8 formed on the bottom of the valve body 1. The lower end of the bearing 8 is adapted to be closed by a removable plug 9 whereby sediment may be removed from the valve casing. The pilot or guide 7 of the valve is provided with a pressure equalizing groove 12 which extends upwardly into chamber 6 to prevent suction on the lower end of the pilot 7 when the valve is being raised from its seat.

At its upper end the valve 5 is provided with a stem 13 which extends upwardly from an enlarged base 14 where the stem and valve join. The valve stem 13 is provided with shoulders forming abutments and has threaded and squared portions thereon for the purposes hereinafter fully described.

The open upper end of the valve body 1 is adapted to be closed by a removable bonnet 15 held in position by nuts or studs 16 which are received on the ends of machine bolts passing through the cooperating flanges of the valve body 1 and bonnet 15. The body 1 has a groove 18 around the opening in which is positioned a gasket 19, the bonnet having a corresponding portion for entering the groove 18 to compress the gasket 19 for an accurate seal. It will be noted by this construction that the gasket is fully protected by the grooved body of the valve.

From Figure 3 it will be apparent that the bonnet 15 comprises an annular base or collar portion bolted to a flange on the valve body and two upstanding arms or webs 17 joined at their upper ends by an annular collar portion 21. Annular portion 21 is provided with an inwardly extending flange 22 having its upper face recessed to receive a gasket 23. Just above the flange 22 the annular portion 21 of the bonnet is provided with an annular chamber 24 which serves as a lubricant reservoir. A grease connection or fitting 25 of well known type communicates with the lubricant reservoir 24, the fitting 25 being protected by an outstanding annular flange 26 as clearly seen in Figure 1.

The valve stem 13 is provided with a shoulder 27 formed by a reduced section on the stem, and low friction washers such as brass washers 28 are positioned on the shoulder 27. Above the lubricant reservoir 24 the annular portion 21 of the bonnet is internally threaded to receive the corresponding threads of a plug elevating and lowering nut 32. The nut 32 at its lower edge is adapted to engage the washers 28 whereby rotation of the nut in one direction forces the valve stem 13 and the valve 5 downwardly into tight engagement with its seat 4 in the valve body. It will be noted that the nut 32 closely surrounds the valve stem 13 to provide additional support therefor and to provide a working fit.

Above the nut 32, the valve stem 13 is provided with a threaded section 33 having a shoulder 34 at the base thereof. Thrust nut 35 is threaded on the section 33, and anti-friction washers 36 are interposed between the lower face of the nut 35 and the raising and lowering nut 32. The thrust nut 35 and section 33 are preferably provided with left hand threads such that the nut tends to tighten during operation of the valve. Furthermore, it will be noted that the thrust nut 35 is set down into the elevating and lowering nut 32 so that the thrust nut is fully protected, and the arrangement is compact and yet readily accessible. The thrust nut projections sufficiently above the upper end of the elevating and lowering nut 32 and this projecting portion has flat faces such that it may be adjusted by a spanner wrench. It will be noted that a clearance is provided at 37 between the upper edge of the annular section 21 of the bonnet 15 and the inwardly projecting threaded portion of the raising and lowering nut 32.

In order to prevent the valve from being raised so far from its seat that extraneous matter may get between the valve and its seat, an adjustable stop mechanism is provided for the nut 32. This mechanism includes an adjustable stop collar 38 which is secured around the upper end of the annular portion 21 of the bonnet, and is secured in adjusted position by a set screw 39. It will be obvious, however, that other means of adjusting this collar may be used. Collar 38 carries an outwardly extending lug 42 for cooperative engagement with a downwardly extending stop pin 43 screwed into the overhanging flange of the nut 32. It will be seen from this construction that the raising and lowering nut 32 may be given approximately one full turn for raising and lowering the valve before the stop pin 43 engages the stop lug 42. Thus a visual indication is provided as to whether the valve is raised or lowered from its seat and excessive raising and lowering is prevented.

The raising and lowering nut 32 has a downwardly extending external flange 44 which encircles the upper portion of the stop ring 38. This overhanging portion effectively prevents the entrance of grit or other foreign matter or gases to the operating threads of the raising and lowering nut 32. The raising and lowering nut 32 has the upstanding flange 45 spaced from valve stem 13, which as previously described, partially encloses the thrust nut 35. This portion 45 has flat faces thereon for the reception of a wrench for rotating the raising and lowering nut 32. Furthermore the upper face of the outstanding flange on the nut 32 is adapted to receive designations such as arrows which are visible from the top of the valve to indicate the correct rotation for raising or lowering the valve.

The upper end of valve stem 13 above the threaded portion 33 is tapered as seen at 46 and this section is preferably square or angular to receive a correspondingly shaped opening in the false turning nut 47 by which the valve is rotated from open to closed position and vice versa. The false nut 47 is retained in position by a locknut 48 threaded on the end of the valve stem 13. Preferably the external faces of the false turning nut 47 and the upstanding portion 45 on the raising and lowering nut 32 are similar in configuration so that one wrench or handle may be used to both raise or lower the valve and open or close the same.

It will be noted that a chamber 52 is provided around the upper end of the valve 5 and beneath the inwardly projecting flange 53 of the bonnet. In some installations, it is desirable to lubricate the valve and its seat and a detachable lubricant fitting 51 is adapted to be threaded into the end of a passageway through the base of the bonnet 15 and communicating with the chamber 52. Lubricant may thus be inserted in the chamber 52 to lubricate the valve and its seat, and in order to assist the passage of the lubricant the full depth of the valve 5, the seat 4 of the body 1 is provided with a plurality of shallow grooves 54, extending from the chamber 52 downwardly to the chamber 6. The threaded opening in which the lubricant fitting 51 is received is also adapted to receive a pipe plug for closing this opening when lubrication of the valve on its seat is unnecessary.

As seen from Figures 2 and 3, the bonnet 15 has upstanding apertured lugs 56 diametrically opposite one another for the reception of pivot pins 57 which support the gland bolts 58. Bolts 58 are adapted to be slidably received in notches in the opposite sides of the upper flange 59 of the gland packing member 61. The gland 61 closely surrounds the valve stem 13 and is slidable with respect thereto and is adapted to extend downwardly into an annular recess formed at the base of the bonnet 15. Within the recess is positioned the packing 62 which may be compressed by rotation of the nuts provided on the ends of the gland bolts 58. The lower edge of the packing gland 61 and the upper face of the flange 53 of the bonnet 15 are cut angularly in order to firmly press the packing 62 against the valve stem 13. It will be noted from this construction that ready access may be had to the nuts for the gland member, since as seen from Figure 3 the gland nuts may be tightened without disassembling any of the parts. Therefore, the packing around the valve stem may be tightened at any time and may be replaced with the valve in service. The flange 53 provides a lower bearing for valve stem 13, and it will be seen that the valve and stem are supported for rotation and reciprocation by two vertically spaced bearings, namely bearing 8, and bearing 53.

The upper face of valve 5 is provided with a stop lug 64 integral therewith which cooperates with similar lugs 65 mounted on the valve bonnet 15 and projecting downwardly into the chamber 52. These stop lugs 64 and 65 cooperate to prevent overturning of the valve and indicate the full open or closed position thereof when engaged.

The operation of the embodiment as thus far described is as follows: It will be noted that the valve is shown in the closed position and lowered into intimate contact with its seat. The gland nuts may be readily tightened to slide the gland 59 downwardly on the valve stem 13 to secure a fluid and gas tight joint around the stem. If the valve is of the type requiring lubrication around the valve and its seat, such lubricant may be forced into chamber 52 through the lubricant fitting 51, and this lubricant will pass by way of the grooves 54 downwardly into the lower chamber 6 and will effectively lubricate the entire length of the valve as the same is turned on its seat.

Lubricant may also be forced into the lubricant chamber 24 through the fitting 25 and this lubricant will be forced upwardly between the valve stem 13 and the raising and lowering nut 32, and will also pass upwardly around the threads between the raising and lowering nut 32 and the threaded portion 21 of the bonnet 15. The lubricant which thus rises under pressure is received in a lubricant reservoir 67 at the top of the threads. The slight clearance between the outstanding flange of the raising and lowering nut 32 and the upper surfaces of the bonnet member 21 and the ring 33 provide an additional wall for lubricant. This overhang of nut 32 also effectively prevents the entrance of grit or foreign matter to well 67. The downwardly extending portion 44 on the nut 32 serves to further protect this lubricant, but it will be understood that the downwardly extending portion 44 of the nut may be eliminated since the outstanding portion thereof will protect against the entrance of foreign matter. Lubricant in the reservoir 24 may effectively work around the stem 13 to the flange 22, but the gasket 23 prevents the substantial loss of lubricant from the well.

When it is desired to open the valve, the nut 32 is rotated in the direction indicated by the arrow on the upper surface of the flange 44 thereof. This nut therefore moves upwardly due to its engagement with the threads of the bonnet portion 21 and by engagement with the low friction washers 36 the nut acts against the abutment member or thrust nut 35 to positively raise the valve stem 13 and the valve 5 from its seat 4. Rotation of the nut 32, however, is limited by the stop members 42 and 43, and the valve may not be raised to an excessive extent sufficient to allow the entrance of grit between the valve and its seat. The same wrench or handle which is used to raise the valve may then be positioned on the false turning nut 47 and rotation of this member causes rotation of the stem 13 and the valve 5 to position the plug valve in the open position. The stop lugs 64 and 65 prevent turning the valve beyond the full open position. The raising and lowering nut 32 is then rotated in reverse direction, the lower end thereof engaging the shoulder 27 on the valve stem 13 with the washers 28 therebetween to positively force the valve downwardly into firm engagement with its seat. The grooves 54 effectively lubricate the valve and its seat to prevent sticking thereof, and the groove 12 in the pilot 7 of the valve serves to equalize the pressure above and below the member 7 so that no suction or pressure is present in the chamber 6.

One important practical advantage of the valve thus far described is the two point bearing for the integral valve and valve stem. It will be seen that the valve and stem are accurately guided for reciprocation and rotation in the bearings provided between the pilot 7 and the bearing 8, and between the lower end of the stem 13 and the bearing flange 53. In addition to these bearings the raising and lowering nut 32 functions as a bearing for guiding the valve stem.

In Figure 4 there is illustrated a slight modification in which the upper lubricant reservoir 24 of the prior form is eliminated. In this embodiment of the invention, the lubricant fitting 25 communicates with a passage 71 through the annular portion 21 of the bonnet 15, and the raising and lowering nut 32 has a groove 72 therein. Groove 72 is slightly arcuate so that one portion thereof is always in alignment with the passageway 71. Furthermore, in this embodiment of the invention the false turning nut 47 for rotating the valve from open to closed position is eliminated, and the upper end of the valve stem 13 is adapted to receive a handle or wrench of any preferred type. The upper end of the valve stem is adapted to have indicating arrows on the surface 73 to indicate the direction for turning the valve to open or closed position and the visible upper surface 74 of the raising and lowering nut 32 also has an arrow thereon for indicating the direction to turn in raising the plug. In this form of the invention since the lubricant reservoir 24 is eliminated, the packing 23 is not necessary.

The operation of this embodiment of the invention is substantially as previously described. However, when lubricant is forced through the fitting 25, it passes inwardly to the arcuate slot 72 and thus directly to the stem 13 and downwardly to the lower friction washer 28. Furthermore, lubricant passes under pressure upwardly into the lubricant well 67. If found desirable vertical grooves may be provided in the raising and lowering nut 32 adjacent the stem 13 to allow the lubricant to effectively lubricate the stem. Furthermore, similar grooves may be provided at the threaded portion of the nut 32 to lubricate this nut. However, by applying sufficient pressure to the lubricant through the fitting 25, lubricant can generally be forced upwardly through the threads and upwardly around the stem 13 without the necessity of grooves.

As in the prior described form, the lubricant fitting 25 is effectively prevented from breakage by the outstanding flange on the bonnet construction, and the threaded engagement of the lift nut 32 is effectively shielded from the entrance of foreign matter. Furthermore, the flange 61 may be tightened or repacked without disturbing the valve or the lifting nut therefor.

Valves constructed in accordance with the embodiments herein illustrated are sturdy and rugged in service and are adapted to be effectively used in high pressure and high temperature lines. The plug is directly lifted mechanically by the direct action of a simple nut acting against abutments on the valve stem. The positive action of this lifting mechanism is entirely independent of the line pressure and the lubricant pressure. The strength of the moving parts of the lifting mechanism is sufficient to preclude any danger of breaking even under severe service conditions. For example, on a two inch valve a force of forty-five hundred pounds exerted by a fifty pound pull on an eighteen inch wrench may be used to either unseat the plug or force it into its seat without jeopardizing any part of the valve assembly.

The plug when raised due to the substantial bearing both above the plug and at the pilot bearing below the same is held just out of contact with its seat regardless of operating pressures. The clearance between the plug and seat is just sufficient to permit free rotation of the plug but is not enough to permit entrance of foreign matter between the contacting surfaces. Another important feature is that no rotation of the plug can take place until the same is raised out of contact with its seat, and thus there is no wear or scoring due to the close metal to metal contact between the plug and the seat. Since the operating threads of the lifting nut are fully protected against mechanical injury, and are also packed in lubricant they are given full protection against the weather, gas fumes, or other atmospheric agents, and against the entrance of foreign matter to the threads. Furthermore, the raising and lowering nut and the operating mechanism therefor is well removed from the valve proper and the pipe lines connected thereto, such that high temperatures at the valve do not affect the lifting nut.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed, and desired to be secured by United States Letters Patent is:—

1. A rotary valve of the type adapted to be raised from its seat before opening or closing movement thereof comprising a casing having a conical seat therein, and an opening substantially in alignment with said seat, a valve in said casing for cooperation with said seat and having a projecting stem, a bonnet secured over the opening in said casing, vertically spaced collars on said bonnet surrounding said valve stem and connected by spaced webs, an externally adjustable packing gland surrounding said valve stem between said collars, abutments on said valve stem above said upper collar, a raising and lowering nut threaded on said bonnet above said upper collar and engageable with said abutments on said stem, and means to lubricate the threads of said nut and the engagement of said nut with the stem.

2. The invention as defined in claim 1 wherein the means to lubricate includes a lubricant well between the upper collar and the lower end of said nut.

3. The invention as defined in claim 1 wherein the means to lubricate includes a fitting secured to said bonnet, and a protecting cup surrounding said fitting to prevent injury thereof.

4. A rotary valve of the type adapted to be raised from its seat prior to rotation thereof comprising a casing having a conical seat therein, a valve for cooperation therewith and having a stem, a bonnet on said valve casing having a bearing adjacent the inner end thereof for the valve stem, abutments on said valve stem, and a raising and lowering nut mounted on said stem between said abutments, said nut being threadedly engaged with the upper end of said bonnet, and having an upwardly extending flange spaced from said stem, one abutment on said stem comprising a thrust nut threaded on said stem and substantially positioned within the upwardly extending flange on said raising and lowering nut.

5. The invention as defined in claim 4 wherein the upwardly extending flange on said raising and lowering nut has angularly arranged faces to receive a similarly shaped handle, said stem projecting beyond said thrust nut, and a false nut non-rotatably secured thereto and having angularly arranged faces similar to those of the raising and lowering nut, whereby one handle may be used to raise or lower the valve and turn the same.

6. A rotary valve of the type adapted to be raised prior to rotation thereof comprising a casing having a conical seat therein, a valve for cooperation with said seat and having a stem, a bonnet on said casing having vertically spaced collars around said stem, abutments on said stem above said collars, a raising and lowering nut engaging said stem between said abutments, said nut being threaded into the upper end of said bonnet, and a lubricant well between said bonnet and said nut above the threaded portions thereof.

7. The invention as defined in claim 6 wherein said nut has an outwardly extending portion projecting beyond the upper end of the bonnet to protect said lubricant well.

8. A plug valve comprising a housing, a valve seat, a plug cooperatively mounted with relation to said valve seat, a stem and pilot for said plug, a means for rotating said plug, means for raising and lowering said plug with relation to said valve seat, said means comprising a member freely rotatable upon said stem and operative by such rotation to raise or lower said plug, means operably connected to said member for regulating the distance which said plug may be raised from its seat, and means for lubricating said plug and its seat and said pilot.

9. A plug valve comprising a housing, a valve seat, a plug cooperatively mounted with relation to said valve seat, a stem and pilot for said plug, a means for rotating said plug, means for raising and lowering said plug with relation to said valve seat, said means comprising a member freely rotatable upon said stem and operative by such rotation to raise or lower said plug, means operably connected to said member adjustable angularly in a plane at right angles to the axis of said stem for regulating the distance which said plug may be raised from its seat, and means for lubricating said plug and its seat and said pilot.

10. A plug valve comprising a housing, a valve seat, a plug cooperatively mounted with relation to said valve seat, a means for rotating said plug, means for raising and lowering said plug with relation to said valve seat, said means comprising a member freely rotatable upon said stem and operative by such rotation to raise or lower said plug, means operably connected to said member for regulating the distance which said plug may be raised from its seat, and means embodying longitudinal extending grooves formed in said plug and said seat and a longitudinal extending groove formed in said pilot for lubricating said plug and its seat and said pilot.

11. A plug valve comprising a housing, a valve seat, a plug cooperatively mounted with relation to said valve seat, an apertured yoke secured to said housing, a stem and pilot for said plug, said stem projecting through said yoke, means for raising and lowering said plug with relation to said valve seat embodying a member mounted upon the upper end of said yoke freely rotatable upon said stem and operative by such rotation to raise or lower said plug, means operably connected to said member comprising a depending stop on said member and a cooperating stop member on said yoke for regulating the distance which said plug may be raised from its seat, and means for lubricating said plug and its seat and said pilot.

12. A plug valve comprising a housing, a valve seat, a plug cooperatively mounted with relation to said valve seat, an apertured yoke secured to said housing, a stem and pilot for said plug, said stem projecting through said yoke, a means for rotating said plug, means for raising and lowering said plug with relation to said valve seat embodying a member mounted upon the upper end of said yoke freely rotatable upon said stem and operative by such rotation to raise or lower said plug, means operably connected to said member comprising a depending stop on said member and a cooperating stop member on said yoke for regulating the distance which said plug may be raised from its seat, and means embodying longitudinal extending grooves formed in said plug and said seat and a longitudinal extending groove formed in said pilot for lubricating said plug and its seat and said pilot.

13. A rotary valve of the type adapted to be raised prior to rotation thereof, comprising a casing having a tapered seat therein, a valve for cooperation with said seat and having a stem, a bonnet on said casing having vertically spaced collars around said valve stem, abutments on said stem, a raising and lowering nut on said stem between said abutments, said nut being threaded into the upper end of said bonnet and a lubricant passage through said bonnet directly to the threads of said nut and bonnet, said passage communicating directly with the space between said nut and stem.

14. The invention defined in claim 13, wherein a lubricant well is provided between said nut and bonnet above the threaded portions thereof.

ELDON S. CLARK.